United States Patent
Yao et al.

(10) Patent No.: US 12,082,160 B2
(45) Date of Patent: Sep. 3, 2024

(54) V2X FREQUENCY AND TIME RESOURCE INDICATION SIGNALING

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Wei Zeng, Saratoga, CA (US); Yushu Zhang, Beijing (CN); Hong He, San Jose, CA (US); Haitong Sun, Cupertino, CA (US); Weidong Yang, San Diego, CA (US); Oghenekome Oteri, San Diego, CA (US); Yuchul Kim, San Jose, CA (US); Yang Tang, San Jose, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/895,362

(22) Filed: Aug. 25, 2022

(65) Prior Publication Data
US 2023/0037889 A1 Feb. 9, 2023

Related U.S. Application Data

(63) Continuation of application No. 17/267,204, filed as application No. PCT/CN2020/074918 on Feb. 12, 2020, now Pat. No. 11,950,208.

(51) Int. Cl.
*H04W 72/02* (2009.01)
*H04L 1/08* (2006.01)
(Continued)

(52) U.S. Cl.
CPC ............ *H04W 72/02* (2013.01); *H04L 1/08* (2013.01); *H04W 72/0453* (2013.01); *H04W 72/20* (2023.01)

(58) Field of Classification Search
CPC . H04W 72/02; H04W 72/0453; H04W 72/20; H04L 1/08; H04L 1/0041;
(Continued)

(56) References Cited

U.S. PATENT DOCUMENTS

2020/0037343 A1   1/2020  He et al.
2021/0112544 A1*  4/2021  Chen .................... H04W 52/242
2021/0320749 A1* 10/2021  Liu ........................ H04L 1/0023

FOREIGN PATENT DOCUMENTS

CN      110677883 A      1/2020
EP      3962219 A1       2/2022
(Continued)

OTHER PUBLICATIONS

RAN1 Chairman's Notes; 3GPP TSG RAN WG1 Meeting #98bis; Oct. 14, 2019.
(Continued)

*Primary Examiner* — Charles C Jiang
*Assistant Examiner* — Shawn D Miller
(74) *Attorney, Agent, or Firm* — Eschweiler & Potashnik, LLC

(57) ABSTRACT

Systems, methods, and circuitries are provided for performing sidelink communication. An example method includes receiving, via frequency and time resources of a physical sidelink shared channel (PSSCH), from a second UE, a signal encoding a sequence of bits corresponding to sidelink control information (SCI) stage 2; decoding the sequence of bits based on a SCI stage 2 scrambling initialization value (Cinit) to generate SCI stage 2 for a transport block (TB), wherein Cinit is determined based on at least a portion of a physical sidelink control channel (PSCCH) cyclic redundancy check (CRC) code; and receiving the TB from the first UE based on the SCI stage 2.

12 Claims, 10 Drawing Sheets

(51) Int. Cl.
  *H04W 72/0453* (2023.01)
  *H04W 72/20* (2023.01)
(58) Field of Classification Search
  CPC ..... H04L 1/0072; H04L 1/189; H04L 1/1896;
    H04L 5/0053; H04L 5/0098; H04L
    1/1887; H04L 1/0061; Y02D 30/70
  See application file for complete search history.

(56) References Cited

FOREIGN PATENT DOCUMENTS

| EP | 4040706 A1 | 8/2022 |
|---|---|---|
| EP | 4047845 A1 | 8/2022 |
| WO | 2018/171540 A1 | 9/2018 |
| WO | 2019/195505 A1 | 10/2019 |

OTHER PUBLICATIONS

Nokia; Reminders for usage of IT resources, IPR declaration and antitrust compliance; 3GPP TSG RAN #86; Dec. 9, 2019.
MCC Support; Final Report of 3GPP TSG RAN WG1 #96b v1.0.0; 3GPP TSG RAN WG1 Meeting #97; R1-1905921; May 13, 2019.
MCC Support; Final Report of 3GPP TSG RAN WG1 #99 v1.0.0; GPP TSG RAN WG1 Meeting #100e; R1-2000151.
Email; 3gpp_tsg_ran_wg1: tsg ran working group 1 <3GPP_TSG_RAN_WG1@LIST.ETSI.ORG; Nov. 5, 2019.
LG Electronics; Task list for 5G V2X in RAN1#100; 3GPP TSG RAN #86; RP-193198; Dec. 9, 2019.
ZTE, Sanechips; NR Sidelink physical layer structure; 3GPP TSG RAN WG1 #99; R1-1912514; Nov. 18, 2019.
Intel Corporation; Summary#4 for AI 7.2.4.2.2 Mode-2 Resource Allocation; 3GPP TSG RAN WG1 Meeting #99; R1-1913569; Nov. 18, 2019.
European Extended Search Report mailed Apr. 5, 2023 in connection with application No. 20918945.
International Search Report dated Nov. 17, 2020 for International Application PCT/CN2020/074918.
"3rd Generation Partnership Project; Technical Specification Group Radio Access Network; Evolved Universal Terrestrial Radio Access (E-UTRA) Physical layer procedures (Release 16)." 3GPP TS 36.213 V16.0.0 (Dec. 2019).
"3rd Generation Partnership Project; Technical Specification Group Radio Access Network; NR; Physical channels and modulation (Release 16)." 3GPP TS 38.211 V16.0.0 (Dec. 2019).
"Sidelink physical layer structure for NR V2X." Source: Huawei, HiSilicon. Agenda Item: 7.2.4.1.1. 3GPP TSG RAN WG1 Meeting #99, Reno, USA, Nov. 18-22, 2019. R1-1911882.
3rd Generation Partnership Project; Technical Specification Group Radio Access Network; NR; Physical layer procedures for data; (Release 16); 3GPP TS 38.214 V16.0.0 (Dec. 2019).
LG Electronics; Discussion on physical layer structure for NR sidelink; 3GPP TSG RAN WG1 #99; R1-1912586; Nov. 18, 2019.
Apple; On NR V2X Physical layer Structure; 3GPP TSG RAN WG1 #99; R1-1912810; Nov. 18, 2019.
EP Extended Search report in connection with Application No. 22196247.5 mailed on Dec. 9, 2022.

\* cited by examiner

UNICAST

GROUPCAST

BROADCAST

| SCI Format 0_1 300 | |
|---|---|
| Priority | 3 bits |
| Frequency Resource Assignment $N_{max} = 2$ | $\log_2\left(\dfrac{N^{SL}(N^{SL}+1)}{2}\right)$ bits |
| Frequency Resource Assignment $N_{max} = 3$ | $\log_2\left(\dfrac{N^{SL}(N^{SL}+1)(2N^{SL}+1)}{6}\right)$ bits |
| Time Resource Assignment $N_{max} = 2$ | 5 bits |
| Time Resource Assignment $N_{max} = 3$ | 9 bits |
| Resource Reservation Period | 4 bits |
| DMRS Pattern | [x] bits |
| 2$^{nd}$ Stage SCI Format | [x] bits |
| Beta Offset Indicator | 2 bits |
| Number of DMRS port | 1 bit |
| Modulation and Coding Scheme | 5 bits |
| Reserved Bits | 2-4 bits |

FIG. 3

| $L_{sub}$ | 1 | 1 | 1 | 1 | 1 | 1 | 1 | 1 | 1 | 1 | 1 | 1 | 1 | 1 | 1 | 1 | 2 | 2 | 2 | 2 | 2 | 2 | 2 | 2 | 3 | 3 | 3 | 3 | 4 |
|---|---|---|---|---|---|---|---|---|---|---|---|---|---|---|---|---|---|---|---|---|---|---|---|---|---|---|---|---|---|
| $x_1$ | 0 | 0 | 0 | 0 | 1 | 1 | 1 | 1 | 2 | 2 | 2 | 2 | 3 | 3 | 3 | 3 | 0 | 0 | 0 | 1 | 1 | 1 | 2 | 2 | 0 | 0 | 1 | 1 | 0 |
| $x_2$ | 0 | 1 | 2 | 3 | 0 | 1 | 2 | 3 | 0 | 1 | 2 | 3 | 0 | 1 | 2 | 3 | 0 | 1 | 2 | 0 | 1 | 2 | 0 | 1 | 0 | 1 | 0 | 1 | 0 |
| FRIV | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |

FIG. 4

V2X FREQUENCY AND TIME RESOURCE INDICATION SIGNALING

CROSS REFERENCE TO RELATED APPLICATIONS

This application is a National Phase entry application of International Patent Application No. PCT/CN2020/074918 filed Feb. 12, 2020, and is hereby incorporated by reference in its entirety.

BACKGROUND

Vehicle to Everything (V2X) communication encompasses communication from a vehicle-based communication device to a wide array of entities including infrastructure (e.g., traffic signals), other vehicle-based devices, pedestrian-based devices, and/or a power grid. It is believed that widespread implementation of V2X systems will increase road safety, traffic efficiency, and energy savings. V2X is based on communication from one device to another, which is referred to as sidelink communication. Sidelink communication is distinguished from downlink communication (network access point (AP) to user equipment (UE)) and uplink communication (UE to AP). V2X communication relies on devices being able to sidelink communication with limited assistance from a network.

BRIEF DESCRIPTION OF THE DRAWINGS

Some examples of circuits, apparatuses and/or methods will be described in the following by way of example only. In this context, reference will be made to the accompanying figures.

FIG. 3 illustrates an example bit allocation for sidelink control information (SCI) stage 1 Format 1.

FIG. 4 is a chart illustrating an example frequency resource indication values (FRIVs) mapped to various values of first retransmission starting sub-channel, second retransmission sub-channel, and total number of sub-channels in a resource pool, in accordance with various aspects described.

DETAILED DESCRIPTION

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Figure 1A:
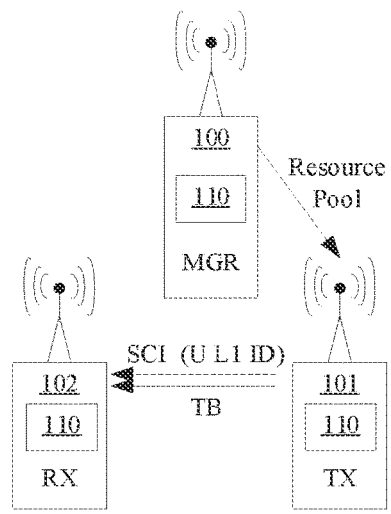
FIGS. 1A, 1B, and 1C illustrate simplified overviews of unicast, groupcast, and broadcast sidelink communication, respectively.
Figure 1B:
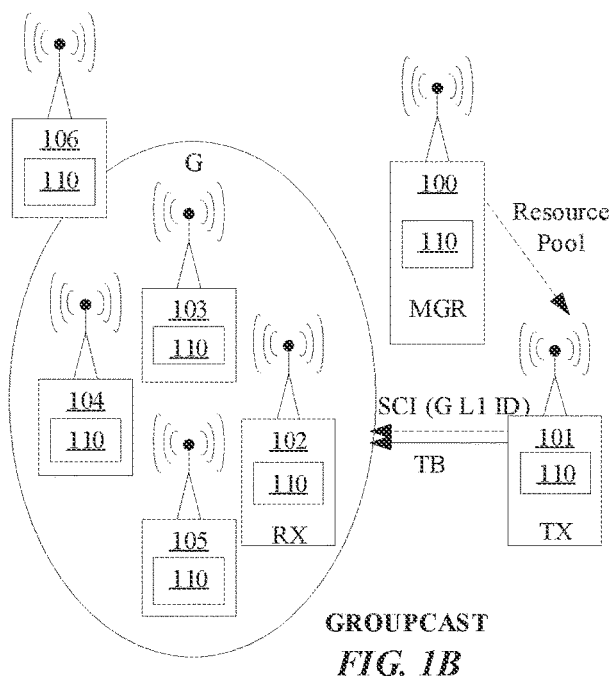
Figure 1C:
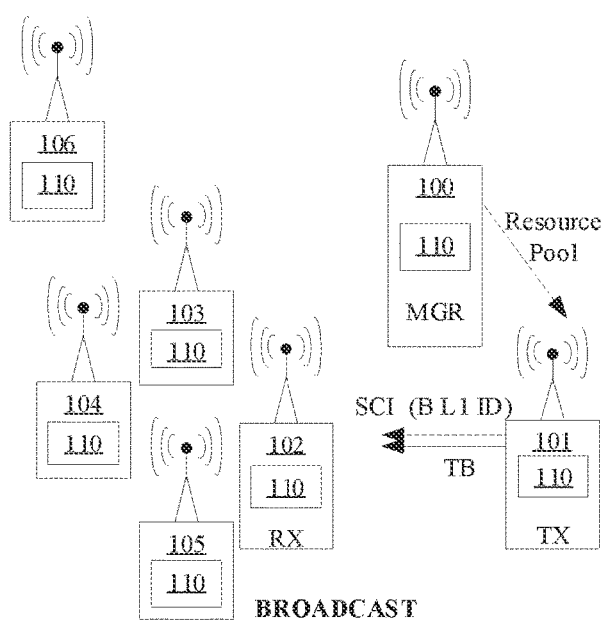

FIGS. 1A-1C are block diagrams of a wireless communication network in which wireless communication devices (e.g., user equipment (UE) devices) use unicast, groupcast, and broadcast communication. Each device in the network includes vehicle-to-everything (V2X) circuitry 110 that includes one or more processors configured to perform various types of V2X communication. For the purposes of this description, when a "device" is described as performing some function, it can be understood that it is the processor(s) in the V2X circuitry that is performing the function. An example wireless communication device is illustrated in more detail in FIG. 11.

A transmitting (TX) device (e.g., device 101) seeking to transmit data to one or more receiving (RX) device(s) in the wireless communication network first determines sidelink channel resources that are available for this purpose. In Mode 1 (not shown see FIGS. 9 and 10), the TX device 101 requests sidelink channel resources from a network or manager device 100 that coordinates communication between the devices in the network. The manager device 100 may be another UE device or a base station device (gNB, eNB, and so on). The manager device 100 provides downlink control information (DCI) and/or sidelink configured grant configurations to the TX device that identifies specific sidelink channel resources to be used by the TX device to transmit data. The specific sidelink channel resources are selected from a resource pool allocated to the network.

Depending on whether the TX device is going to perform a unicast, groupcast, or broadcast transmission of data, the TX device determines (e.g., via higher layer signaling) a Layer-1 destination identifier (L1 destination ID) that uniquely identifies one or more channels between the TX device 101 and a specific RX device (a unicast identifier), a group of RX devices (a groupcast identifier), or all RX devices (a broadcast identifier) in the wireless communication network. In one example, the channels identified by L1 destination IDs are physical sidelink control channels (PSCCH).

In Mode 2 (shown in FIGS. 1A-1C), the TX device 101 selects sidelink channel resources for transmitting data from a pre-allocated resource pool received a priori from a manager device rather than receiving a designation or allocation of particular sidelink communication resources from the manager device 100.

In the unicast example of FIG. 1A, TX device 101 seeks to transmit data to RX device 102 and no other device. To enable this "direct" communication, the TX device 101 uses a unicast LI destination ID for the device 102 to initiate communication with the RX device 102. TX device 101 sends sidelink control information (SCI) using PSCCH resources associated with the LI destination ID for RX device 102. The SCI instructs the RX device 102 how to subsequently receive a transport block (TB) of data from TX device 101. For example, the SCI includes the unicast L1 destination ID for the RX device 102 and identifies frequency and time resources that specify a physical sidelink shared channel (PSSCH) that will be used to transmit (and retransmit in certain circumstances) the TB. The SCI may also instruct the RX device whether to provide feedback, such as an ACK/NACK indication, to confirm receipt of the TB or to communicate that the TB was not received. To this end, the SCI may include a hybrid automatic repeat request (HARQ) process identifier that uniquely identifies the TB for use by the RX device in providing the feedback.

In the groupcast example of FIG. 1B, TX device 101 seeks to transmit data to a group G that includes several devices 102, 103, 104, 105 (while only four devices are in the illustrated group, a different number may be in a group). A Groupcast LI destination ID identifies PSCCH channel(s) monitored by devices in group G for SCI. To enable the groupcast communication, the TX device 101 determines the LI destination ID for the group G. TX device 101 sends SCI using the PSCCH resources associated with the LI destination ID for group G. The SCI instructs devices in group G how to subsequently receive a TB from device 101. For example, the SCI includes the groupcast L1 destination ID for the group G and identifies frequency and time resources that specify a physical sidelink shared channel (PSSCH) that will be used to transmit and retransmit (in certain circumstances) the TB.

The SCI may indicate a groupcast option 1 or 2 that instruct the RX devices in the group G whether and how to provide feedback. In groupcast option 1, when feedback is enabled the only type of feedback provided by the RX device is NACK and in some examples, when a particular RX device is outside a communication range specified in the SCI the RX device does not provide any feedback. In groupcast option 2, when feedback is enabled, both ACK/NACK feedback are provided the by the RX device. The SCI may include a hybrid automatic repeat request (HARQ) process identifier that uniquely identifies the TB for use by the RX device in providing feedback.

In the broadcast example of FIG. 1C, TX device 101 seeks to transmit data to all devices in the network. A Broadcast LI destination ID identifies PSCCH channel(s) monitored by all devices in the network for SCI. To enable the broadcast communication, the device 101 determines the broadcast LI destination ID for the network. TX Device 101 sends SCI using the PSCCH resources associated with the broadcast LI destination ID for the network. The SCI instructs devices the network how to subsequently receive data from device 101. For example, the SCI includes the broadcast L1 destination ID and identifies frequency and time resources that specify a physical sidelink shared channel (PSSCH) that will be used to transmit and retransmit (in certain circumstances) the TB.

Figure 2:
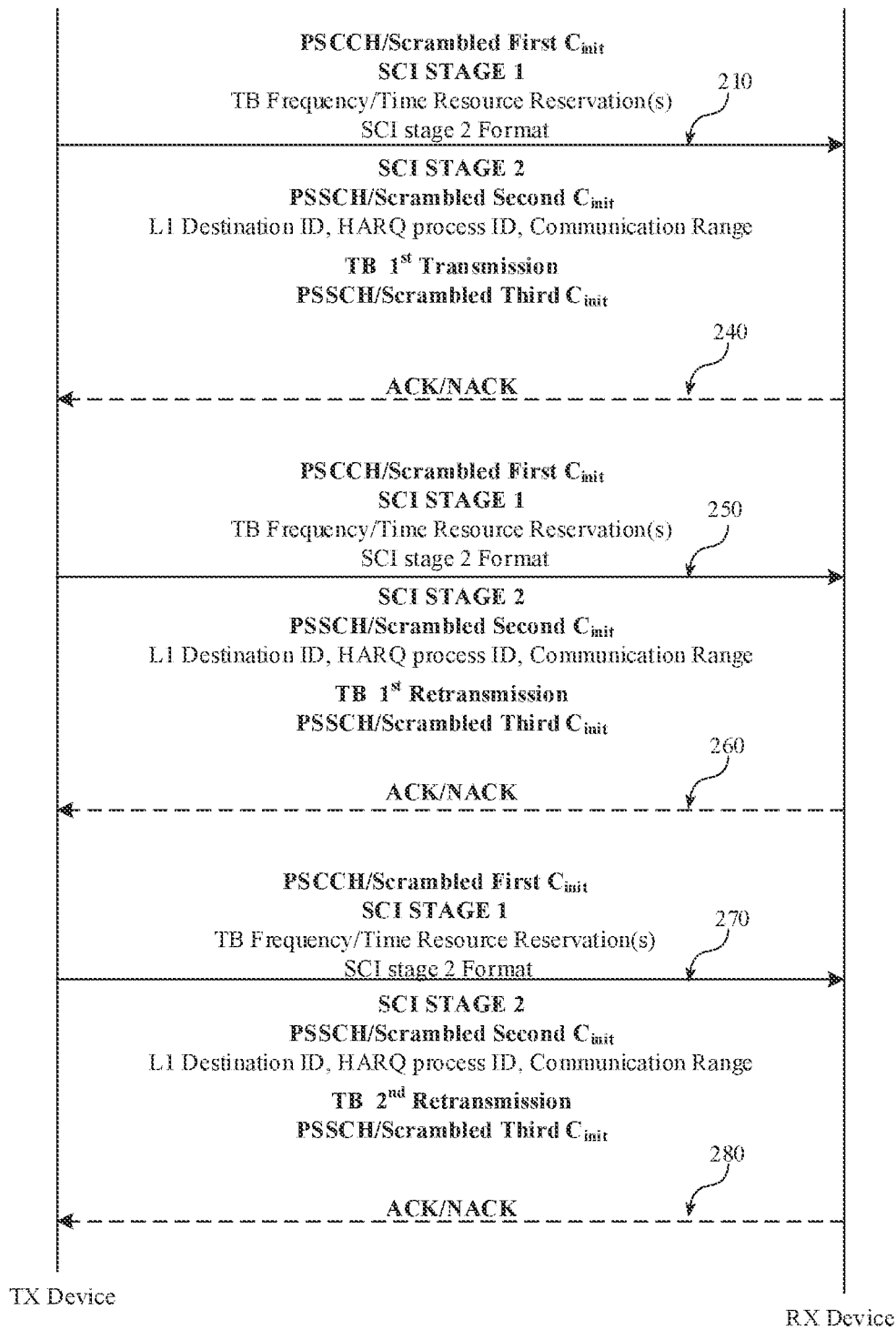
FIG. 2 illustrates an example communication sequence for sidelink communication between a transmit user equipment wireless communication device (UE) and a receiving (RX) UE.

A two-stage SCI process has been adopted in 5G New Radio, an example of which is presented in a simplified form in FIG. 2. In stage 1, the SCI is transmitted on PSCCH using the polar code that has been adopted for NR DCI in the network. The SCI stage 1 information is encoded in a sequence of bits and is scrambled by combining the sequence of bits (e.g., performing modulo 2 addition) with a pseudo-random scrambling sequence that is generated by the TX device using and a first scrambling initialization value $C_{init}$ that is a constant of is configured per resource pool. The resulting sequence of bits are mapped to the frequency and time resources of the PSCCH for the RX device and transmitted by the TX device at 210.

As shown in FIG. 2, SCI stage 1 includes, in part, frequency/time resource reservation(s) for transmission and optionally retransmission of the TB. Sidelink communication in 5G NR supports reservation of resources for up to two retransmissions of the same TB and the number of reserved resources for retransmissions is defined in the SCI stage 1. In the illustrated example the number of reserved resources for retransmissions is 2. SCI stage 1 also indicates an SCI stage 2 format which instructs the RX device on whether or what type of feedback is to be provided.

At 210, the SCI stage 2 is transmitted on PSSCH using the polar code that has been adopted for physical downlink control channel (PDCCH) in the network. The SCI stage 2 information is encoded in a sequence of bits and is scrambled by combining the sequence of bits (e.g., performing modulo 2 addition) with a pseudo-random scrambling sequence that is generated by the TX device using a second $C_{init}$. The resulting sequence of bits are mapped to the frequency and time resources of the PSSCH and transmitted by the TX device at 220. The SCI stage 2 format defines whether or what type of feedback is expected and also includes, in part, a HARQ process ID, a zone ID for the TX device, and a communication range to be used to determine whether or not to provide NACK feedback in groupcast option 1.

At 210, the TX device also transmits the TB using the frequency/time resources allocated in SCI stage 1 at 210. The TB is transmitted on the PSSCH using the LDPC code that has been adopted for physical downlink shared channel (PDSCH) in the network. The TB data is encoded in a sequence of bits and is scrambled by combining the sequence of bits (e.g., performing modulo 2 addition) with a pseudo-random scrambling sequence that is generated by the TX device using a third $C_{init}$. The resulting sequence of bits are mapped to the frequency and time resources of the PSSCH and transmitted by the TX device at 230.

At 240, the RX device provides the appropriate feedback ACK/NACK, NACK only, or no feedback depending on the SCI stage 2 format. If groupcast option 1 (NACK only) is indicated in the SCI stage 2 format, the RX device determines an approximate distance between the TX device and the RX device based on the Zone ID indicated in the SCI stage 2. The RX device compares this distance to the communication range also indicated in the SCI stage 2. If the distance is less than the communication range, the RX device provides NACK feedback as appropriate. If the distance is greater than or equal to the communication range, then the RX device does not provide any feedback.

At 250, the TX device retransmits SCI stage 1 and stage 2 and also the TB using the frequency/time resources reserved in SCI stage 1 at 210. The frequency/time resources for the second and third retransmission of the TB are reserved in the SCI stage 1 at 250 and the frequency/time resources for the first retransmission of the TB are allocated in the SCI stage 1 at 250. In one example if the TX device received an ACK at 240 or did not receive a NACK from the RX device (depending on the SCI stage 2 format), the TX device will not retransmit the TB. In the illustrated example, the TX device retransmits the TB regardless of the received feedback. At 260, the RX device provides the appropriate feedback ACK/NACK, NACK only, or no feedback depending on the SCI stage 2 format and optionally the distance between the TX device and RX device (e.g., groupcast option 1).

At 270, the TX device retransmits SCI stage 1 and stage 2 and also the TB using the frequency/time resources reserved in SCI stage 1 at 210. The frequency/time resources for the third and fourth retransmission of the TB are reserved in the SCI stage 1 at 270 and the frequency/time resources for the second retransmission of the TB are allocated in the SCI stage 1 at 270. At 280, the RX device provides the appropriate feedback ACK/NACK, NACK only, or no feedback depending on the SCI stage 2 format and optionally the distance between the TX device and RX device (e.g., groupcast option 1).

While LTE V2X supports the use of up to two resources for transmitting a transport block, NR V2X supports the use of up to three resources for transmitting a transport block. In NR V2X, a configurable of pre-configurable variable maxNumResource ($N_{max}$) is used to indicate whether 1, 2, or 3 resources are used to transmit a TB. The number of bits allocated in SCI stage 1 format 1 for a "frequency resource assignment" field is $$\log_2\left(\frac{N^{SL}(N^{SL}+1)}{2}\right)$$

when $N_{max}=2$, where $N^{SL}$ is a total number of sub-channels in the resource pool. The number of bits allocated in SCI stage 1 format 1 for a "frequency resource assignment" field is $$\log_2\left(\frac{N^{SL}(N^{SL}+1)(2N^{SL}+1)}{6}\right)$$

when $N_{max}=3$. The number of bits allocated in SCI stage 1 format 1 for a "time resource assignment" field is 5 bits when $N_{max}=2$ and 11 bits when $N_{max}=3$.

Frequency Resource Indication Value and Time Resource Indication Value

FIG. 3 illustrates is a schematic illustration of an example V2X SCI stage 1 Format 1 ("SCI format 0_1") bit allocation 300. The frequency resource assignment includes bits to indicate a frequency resource indication value (FRIV) and the time resource assignment field includes bits to indicate a time resource indication value (TRIV).

In one example the FRIV is an integer that uniquely identifies a combination of the number of sub-channels ($L_{sub}$) in the resource for the TB (all resources for a TB have the same size), an index value for a first starting sub-channel ($x_1$) being reserved for the first retransmission of the TB (if applicable), and an index value for a second sub-channel ($x_2$) being reserved for the second retransmission of the TB (if applicable). The parameter $L_{sub}$ can have an integer value between 1 and $N^{SL}$. The parameters $x_1$ and $x_2$ can each have an integer value ranging from 0 to $N^{SL}-L_{sub}$. In one example, the FRIV is a result of a predetermined function of $L_{SUB}$, $x_1$, and $x_2$ such that the RX UE can determine the values of these three parameters based on the integer value of the FRIV. In another example, the FRIV is the result of some predetermined (known to the RX UE) arbitrary mapping $L_{SUB}$, $x_1$, and $x_2$ to FRIV values.

Following are examples of functions that may be used to determine FRIVs and TRIVs. It is to be understood that the listed functions are merely one way of describing a combination or relationship of the input parameters that produces a desired result. The functions are not intended to be construed as being limited to the mathematical formula listed but rather to be construed broadly as including any function that generates equivalent results using the combinations or relationships of parameters expressed by the function.

In one example, the predetermined function for generating FRIVs generates a contiguous set of FRIV values for possible combinations of $N^{SL}$, $L_{SUB}$, $x_1$, and $x_2$. This minimizes the number of bits needed to communicate the FRIVs. One example FRIV function is:

$$\text{FRIV}=\Sigma_{i=1}^{L_{sub}-1}(N^{SL}+1-i)^2+x_1\cdot(N^{SL}+1-L_{sub})+x_2. \qquad \text{EQ. 1}$$

FIG. 4 illustrates a chart 400 that records FRIV values computed for $N_{max}=3$ and $N^{SL}=4$ using the function of EQ. 1 and an $x_2$ first, $x_1$ second, and $L_{sub}$ third convention. It can be seen that the FRIVs for combinations of $N^{SL}$, $L_{SUB}$, $x_1$, and $x_2$ are a set of contiguous integer values.

Variations of the function of EQ. 1 may be used to generate FRIVs. For example, $x_1$ and $x_2$ may be exchanged, resulting in:

$$\text{FRIV}=\Sigma_{i=1}^{L_{sub}-1}(N^{SL}+1-i)^2+x_2\cdot(N^{SL}+1-L_{sub})+x_1. \qquad \text{EQ. 2}$$

When $x_1$ and $x_2$ range from 1 to $N^{SL}+1-L_{sub}$, the function is adapted:

$$\text{FRIV}=\Sigma_{i=1}^{L_{sub}-1}(N^{SL}+1-i)^2+(x_1-1)\cdot(N^{SL}+1-L_{sub})+x_2. \qquad \text{EQ. 3}$$

With $x_1$ and $x_2$ exchanged in the function of EQ. 3, the function becomes:

$$\text{FRIV}=\Sigma_{i=1}^{L_{sub}-1}(N^{SL}+1-i)^2+(x_2-1)\cdot(N^{SL}+1-L_{sub})+x_1. \qquad \text{EQ. 4}$$

If the FRIV is to start with 1, rather than 0, the formula of EQ. 1 becomes:

$$\text{FRIV}=\Sigma_{i=1}^{L_{sub}-1}(N^{SL}+1-i)^2+x_1\cdot(N^{SL}+1-L_{sub})+x_2+1. \qquad \text{EQ. 5}$$

The function of EQ. 2 becomes:

$$\text{FRIV}=\Sigma_{i=1}^{L_{sub}-1}(N^{SL}+1-i)^2+x_2\cdot(N^{SL}+1-L_{sub})+x_1+1. \qquad \text{EQ. 6}$$

The function of EQ. 3 becomes:

$$\text{FRIV}=\Sigma_{i=1}^{L_{sub}-1}(N^{SL}+1-i)^2+(x_1-1)\cdot(N^{SL}+1-L_{sub})+x_2+1. \qquad \text{EQ. 7}$$

The function of EQ. 4 becomes:

$$\text{FRIV}=\Sigma_{i=1}^{L_{sub}-1}(N^{SL}+1-i)^2+(x_2-1)\cdot(N^{SL}+1-L_{sub})+x_1+1. \qquad \text{EQ. 8}$$

When $N_{max}=2$, one example function for determining FRIVs is as follows, where $x_1$ is the index of the starting sub-channel of the first retransmission and ranges between 0 and $N^{SL}-L_{sub}$:

$$\text{FRIV}=\Sigma_{i=1}^{L_{sub}-1}(N^{SL}+1-i)+x_1. \qquad \text{EQ. 11}$$

In one example the TRIV is an integer that uniquely identifies a combination of a resource reservation window size (S) for the TB (i.e., 32 slots), a first time gap ($\Delta t_1$) between a first time resource on which the TB is transmitted and a second time resource on which the TB is retransmitted a first time, and a second time gap ($\Delta t_2$) between the second time resource and a third time resource on which the TB is retransmitted a second time. In one example, the TRIV is a result of a predetermined function of S, $\Delta t_1$, and $\Delta t_2$ such that the RX UE can determine the values of these three parameters based on the integer value of the TRIV. In another example, the TRIV is the result of some predetermined (known to the RX UE) arbitrary mapping S, $\Delta t_1$, and $\Delta t_2$ to TRIV values.

In one example, the predetermined function for generating TRIVs generates a contiguous set of TRIV values for possible combinations of S, $\Delta t_1$, and $\Delta t_2$. This minimizes the number of bits needed to communicate the TRIVs. One example TRIV function, which follows a third resource timing first and second resource timing second convention, is:

$$\text{TRIV} = \Delta t_1 + \Sigma_{i=1}^{\Delta t_2}(S-1-i) + \Delta t_2. \qquad \text{EQ. 10}$$

In the function of EQ. 10 If there is only one retransmission $\Delta t_1$ ranges between 0 and $S-1-\Delta t_2$. If there are two retransmissions $\Delta t_1$ ranges between 1 and $S-1-\Delta t_2$. $\Delta t_2$ ranges between 0 and $S-2$. This is because retransmissions should not occur in the same time resource (e.g., slot) even though retransmissions may overlap in frequency resource. $\Delta t_1=0$ indicates that the second resource (for a first retransmission) is not reserved. $\Delta t_1>0$ indicates that the second resource (for a first retransmission) is reserved. $\Delta t_2=0$ indicates that the third resource (for a second retransmission) is not reserved. $\Delta t_2>0$ indicates that the third resource (for a second retransmission) is reserved. It is assumed that if the third resource is reserved, then the second resource is also reserved.

Another predetermined function for generating TRIVs, which follows a second resource timing first and third resource timing second convention, is:

$$\text{TRIV} = t_1 + \Sigma_{i=1}^{\Delta t_1-1}(S-1-i) + \Delta t_2. \qquad \text{EQ. 11}$$

In the function of EQ. 11 $\Delta t_1$ ranges between 0 and $S-1$ and $\Delta t_2$ ranges between 0 and $S-1-\Delta t_1$. This is because retransmissions should not occur in the same time resource (e.g., slot) even though retransmissions may overlap in frequency resource. $\Delta t_1=0$ indicates that the second resource (for a first retransmission) is not reserved. $\Delta t_1>0$ indicates that the second resource (for a first retransmission) is reserved. $\Delta t_2=0$ indicates that the third resource (for a second retransmission) is not reserved. $\Delta t_2>0$ indicates that the third resource (for a second retransmission) is reserved. It is assumed that if the third resource is reserved, then the second resource is also reserved.

When $N_{max}=2$, $\Delta t_2=0$ and the following function may be used to generated TRIVs, with $\Delta t_1$ ranging from 1 to $S-1$:

$$\text{TRIV} = \Delta t_1. \qquad \text{EQ. 12}$$

In one example, the above functions to generate FRIVs and TRIVs for SCI are also applied to the corresponding fields of DCI format 3_0 which is used for network (e.g., gNB) to schedule the sidelink transmissions in Mode 1. DCI format 3_0 includes a field "SCI format 0_1 fields of frequency resource assignment and time resource assignment."

Scrambling Sequence Initialization Value

Recall from FIG. 2 that SCI stage 1, SCI stage 2, and TB are first scrambled using different scrambling initialization values $C_{init}$. In one example, the scrambling sequence for SCI stage 2 uses a SCI stage 2 $C_{init}$ that is based on at least a portion of a cyclic redundancy check (CRC) code for PSCCH. To support determination of the SCI stage 2 $C_{init}$ a constant $N_{CONST\_RP}$ having A bits is (pre)configured on a per resource pool basis for the resource pool allocated for sidelink communication. In one example A is an integer between 0 and 31. As used below, PSCCH_CRC refers to a decimal representation of the PSCCH CRC code value. One example function for determining a SCI stage 2 $C_{init}$ for generating a scrambling sequence (e.g., a Gold sequence) for scrambling SCI stage 2 can be expressed as:

$$C_{init} = (N_{PSCCH\_CRC}*2^A + N_{CONST\_RP}) \bmod 2^{31}. \qquad \text{EQ. 13}$$

An alternate function for determining the SCI stage 2 $C_{init}$ for generating the scrambling sequence for SCI stage 2 can be expressed as follows, where $N_{PSCCH\_MSB\_CRC}$ corresponds to (31-A) most significant bits of a decimal representation of the PSCCH CRC code:

$$C_{init} = (N_{PSCCH\_MSB\_CRC}*2^A + N_{CONST\_RP}) \bmod 2^{31}. \qquad \text{EQ. 14}$$

An alternate function for determining the SCI stage 2 $C_{init}$ for generating the scrambling sequence for SCI stage 2 can be expressed as follows, where $N_{PSCCH\_LSB\_CRC}$ corresponds to (31-A) least significant bits of a decimal representation of the PSCCH CRC code:

$$C_{init} = (N_{PSCCH\_LSB\_CRC}*2^A + N_{CONST\_RP}) \bmod 2^{31}. \qquad \text{EQ. 15}$$

In one example, the scrambling sequence for the TB uses a data $C_{init}$ that is based on at least a portion of a cyclic redundancy check (CRC) code value for PSCCH and/or at least a portion of the CRC code value for SCI stage 2. To support determination of the data $C_{init}$ a constant $N_{CONST\_RP}$ having A bits is (pre)configured on a per resource pool basis for the resource pool allocated for sidelink communication. In one example A is an integer between 0 and 31. As used below SCI2_CRC refers to a decimal representation of the SCI stage 2 CRC code value. One function for determining a data $C_{init}$ for generating, based on the SCI stage 2 CRC code value, a scrambling sequence (e.g., a Gold sequence) for scrambling the TB can be expressed as:

$$C_{init} = (N_{SCI2\_CRC}*2^A + N_{CONST\_RP}) \bmod 2^{31}. \qquad \text{EQ. 15}$$

Alternatively, the following example function may be used, where $N_{SCI2\_MSB\_CRC}$ corresponds to (31-A) most significant bits of a decimal representation of the SCI stage 2 CRC code:

$$C_{init} = (N_{SCI2\_MSB\_CRC}*2^A + N_{CONST\_RP}) \bmod 2^{31}. \qquad \text{EQ. 16}$$

Alternatively, the following example function may be used, where $N_{SCI2\_LSB\_CRC}$ corresponds to (31-A) least significant bits of a decimal representation of the SCI stage 2 CRC code:

$$C_{init} = (N_{SCI2\_LSB\_CRC}*2^A + N_{CONST\_RP}) \bmod 2^{31}. \qquad \text{EQ. 17}$$

One example function for determining a data $C_{init}$ based on the SCI stage 2 CRC code value and the PSCCH CRC code value can be expressed as, where $N_{MIX\_CRC}$ depends on both the PSCCH CRC code ($N_{PSCCH\_CRC}$) and the SCI stage 2 CRC code ($N_{SCI2\_CRC}$):

$$C_{init} = (N_{MIXCRC}*2^A + N_{CONST\_RP}) \bmod 2^{31}. \qquad \text{EQ. 18}$$

In one example, $N_{MIXCRC}$ is a result of a logical XOR operation between $N_{SCI2\_CRC}$ and $N_{PSCCH\_CRC}$.

In one example, $N_{MIXCRC}$ is a result of a logical XOR operation between (31-A) most significant bits of $N_{SCI2\_CRC}$ and (31-A) most significant bits of $N_{PSCCH\_CRC}$.

In one example, $N_{MIXCRC}$ is a result of a logical XOR operation between (31-A) most significant bits of $N_{SCI2\_CRC}$ and (31-A) least significant bits of $N_{PSCCH\_CRC}$.

In one example, $N_{MIXCRC}$ is a result of a logical XOR operation between (31-A) least significant bits of $N_{SCI2\_CRC}$ and (31-A) most significant bits of $N_{PSCCH\_CRC}$.

In one example, $N_{MIXCRC}$ is a result of a logical XOR operation between (31-A) least significant bits of $N_{SCI2\_CRC}$ and (31-A) least significant bits of $N_{PSCCH\_CRC}$.

In one example, $N_{MIXCRC}$ is a concatenation of (31−A−B) least significant bits of $N_{SCI2\_CRC}$ and B least significant bits of $N_{PSCCH\_CRC}$, where B is an integer between 0 and 24.

In one example, $N_{MIXCRC}$ is a concatenation of (31−A−B) most significant bits of $N_{SCI2\_CRC}$ and B least significant bits of $N_{PSCCH\_CRC}$, where B is an integer between 0 and 24.

In one example, $N_{MIXCRC}$ is a concatenation of (31−A−B) most significant bits of $N_{SCI2\_CRC}$ and B most significant bits of $N_{PSCCH\_CRC}$, where B is an integer between 0 and 24.

In one example, $N_{MIXCRC}$ is a concatenation of (31−A−B) least significant bits of $N_{SCI2\_CRC}$ and B most significant bits of $N_{PSCCH\_CRC}$, where B is an integer between 0 and 24.

In one example, $N_{MIXCRC}$ is a concatenation of (31−A−B) least significant bits of $N_{PSCCH\_CRC}$ and B least significant bits of $N_{SCI2\_CRC}$, where B is an integer between 0 and 24.

In one example, $N_{MIXCRC}$ is a concatenation of (31−A−B) most significant bits of $N_{PSCCH\_CRC}$ and B least significant bits of $N_{SCI2\_CRC}$, where B is an integer between 0 and 24.

In one example, wherein $N_{MIXCRC}$ is a concatenation of (31−A−B) most significant bits of $N_{PSCCH\_CRC}$ and B most significant bits of $N_{SCI2\_CRC}$, where B is an integer between 0 and 24.

In one example, $N_{MIXCRC}$ is a concatenation of (31−A−B) least significant bits of $N_{PSCCH\_CRC}$ and B most significant bits of $N_{SCI2\_CRC}$ where B is an integer between 0 and 24.

One function for determining a data $C_{init}$ for generating, based on the PSCCH CRC code value, a scrambling sequence (e.g., a Gold sequence) for scrambling the TB can be expressed as:

$$C_{init}=(N_{PSCCH\_CRC}*2^A+N_{CONST\_RP}) \bmod 2^{31}. \quad \text{EQ. 19}$$

An alternate function for determining the data $C_{init}$ can be expressed as follows, where $N_{PSCCH\_MSB\_CRC}$ corresponds to (31−A) most significant bits of a decimal representation of the PSCCH CRC code:

$$C_{init}=(N_{PSCCH\_MSB\_CRC}*2^A+N_{CONST\_RP}) \bmod 2^{31}. \quad \text{EQ. 20}$$

An alternate function for determining the data $C_{init}$ can be expressed as follows, where $N_{PSCCH\_LSB\_CRC}$ corresponds to (31−A) least significant bits of a decimal representation of the PSCCH CRC code:

$$C_{init}=(N_{PSCCH\_LSB\_CRC}*2^A+N_{CONST\_RP}) \bmod 2^{31} \quad \text{EQ. 21}$$

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of the entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of the entity is to be construed broadly as encompassing any manner of identifying the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term encode when used with reference to some entity or value of the entity is to be construed broadly as encompassing any manner or technique for generating a data sequence or signal that communicates the entity to another component.

Figure 5:
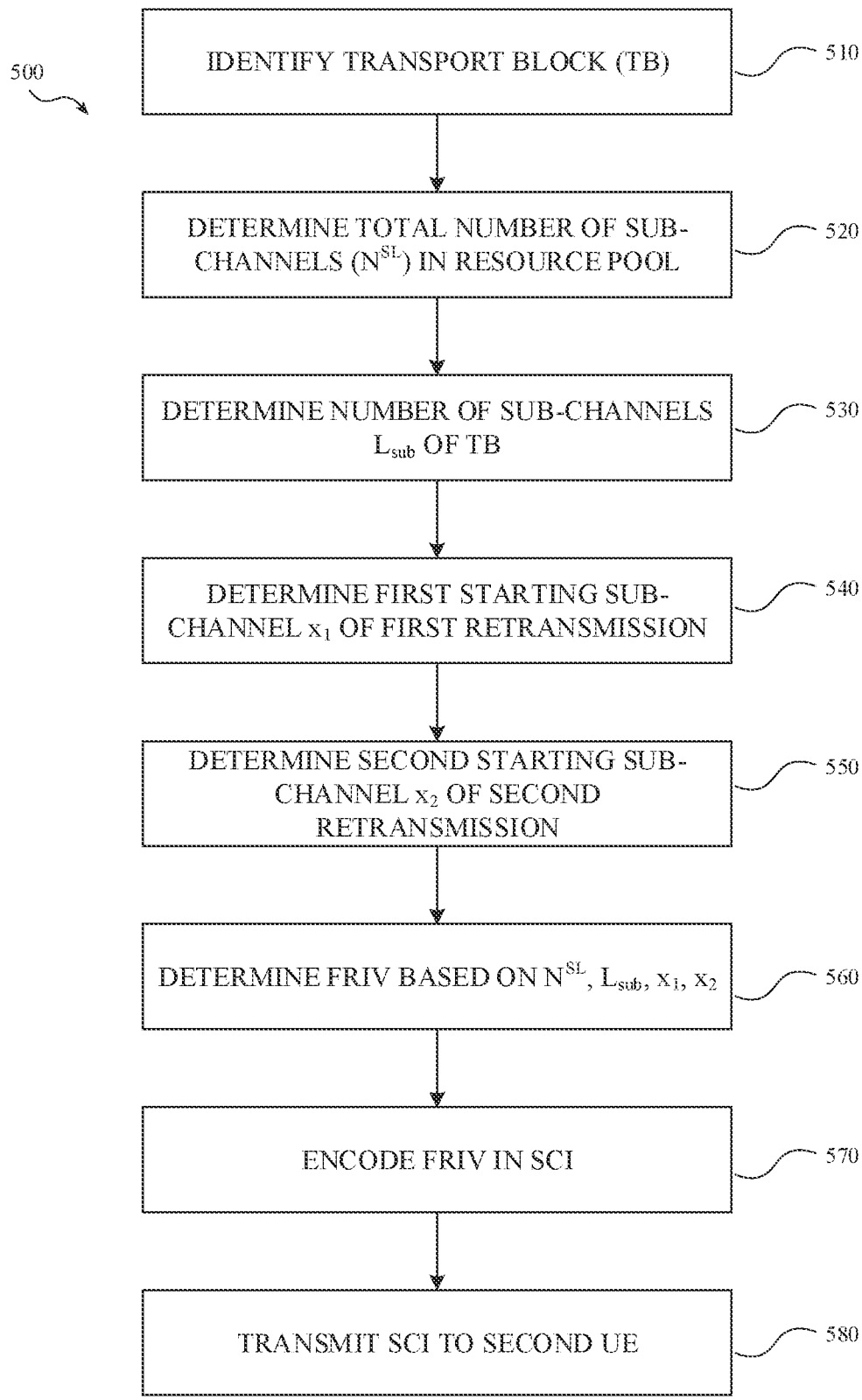
FIG. 5 illustrates a flow diagram of an example method for indicating frequency resource reservation in a SCI stage 1 communication, in accordance with various aspects described.

FIG. 5 is a flow diagram outlining an example method 500 for indicating a frequency resource reservation in a sidelink control information (SCI). The method 500 may be performed by processors executing stored instructions and/or hardware components of a wireless communication device such as a UE or eNB/gNB. The method includes, at 510, identifying a transport block (TB) for transmission to a UE. At 520, the method includes determining a total number of sub-channels ($N^{SL}$) in a resource pool for sidelink communication. At 530 a number of sub-channels ($L_{sub}$) of the TB is determined. The method includes determining a first starting sub-channel index $x_1$ of a first retransmission of the TB at 540 and determining a second starting sub-channel index $x_2$ of a second retransmission of the TB at 550. The method includes, at 560, determining a frequency resource indication value (FRIV) based on $N^{SL}$, $L_{SUB}$, $x_1$, and $x_2$, wherein the FRIV represents a result of a predetermined function of $L_{sub}$, $x_1$, and $x_2$ that generates a unique value for possible combinations of $L_{sub}$, $x_1$, and $x_2$. The FRIV is encoded in SCI at 570 and the SCI is transmitted to the UE at 580.

Figure 6:
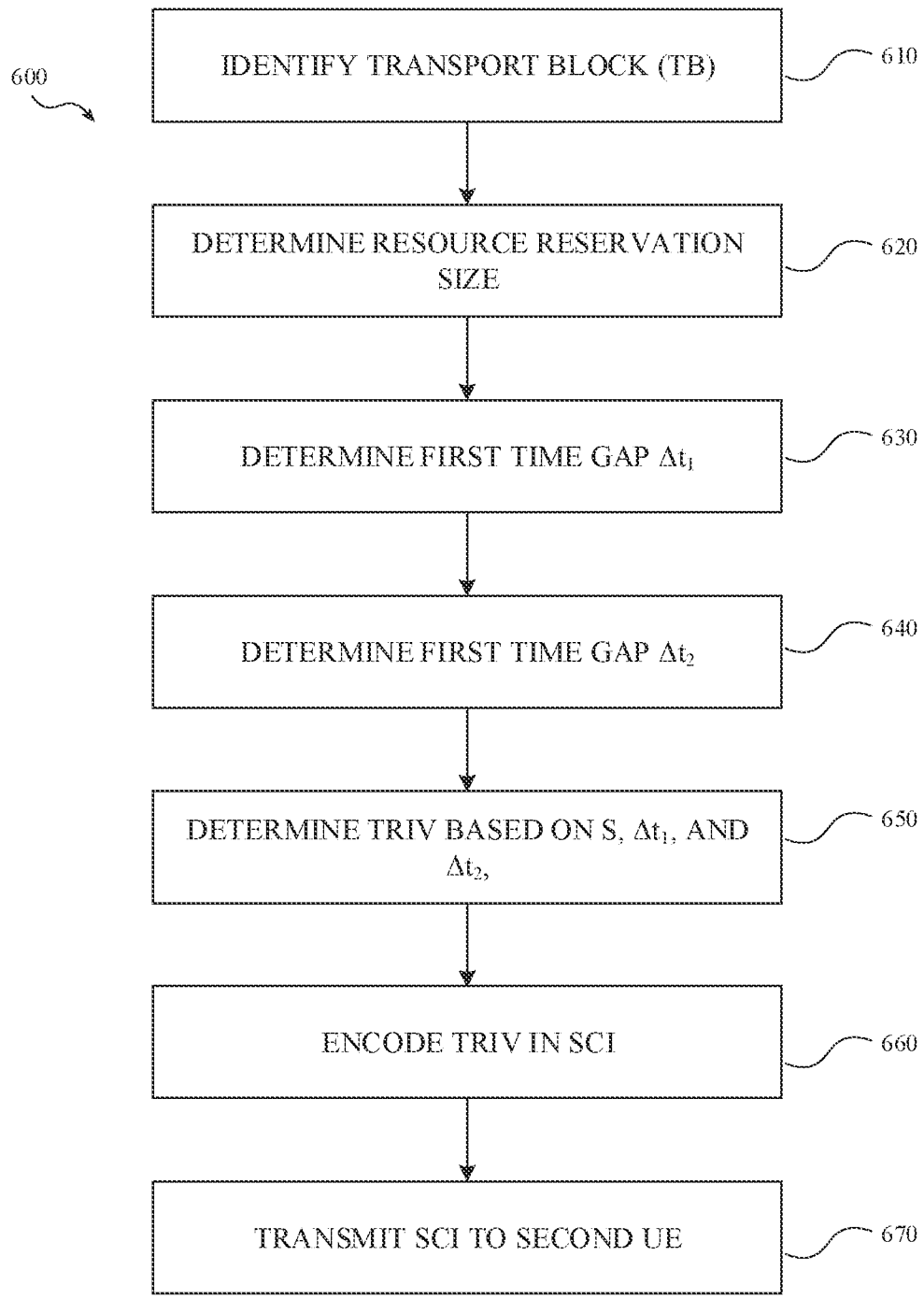
FIG. 6 illustrates a flow diagram of an example method for indicating time resource reservation in a SCI stage 1 communication, in accordance with various aspects described.

FIG. 6 is a flow diagram outlining an example method 600 for indicating a time resource reservation in a sidelink control information (SCI). The method 600 may be performed by processors executing stored instructions and/or hardware components of a wireless communication device such as a UE or eNB/gNB. The method includes, at 610, identifying a transport block (TB) for transmission to a UE. The method includes, at 620, determining a resource reservation window size S in a resource pool for sidelink communication. A first time gap $\Delta t_1$ between a first time resource on which the TB is transmitted and a second time resource on which the TB is retransmitted a first time is determined at 630 and at 640 a second time gap $\Delta t_2$ between the second time resource and a third time resource on which the TB is retransmitted a second time is determined. The method includes, at 650, determining a time resource indication value (TRIV) based on S, $\Delta t_1$, and $\Delta t_2$, wherein the TRIV represents a result of a predetermined function of S, $\Delta t_1$, and $\Delta t_2$ that generates a unique value for possible combinations of S, $\Delta t_1$, and $\Delta t_2$. At 660 the TRIV is encoded in the SCI and at 670 the SCI is transmitted to the UE.

Figure 7:
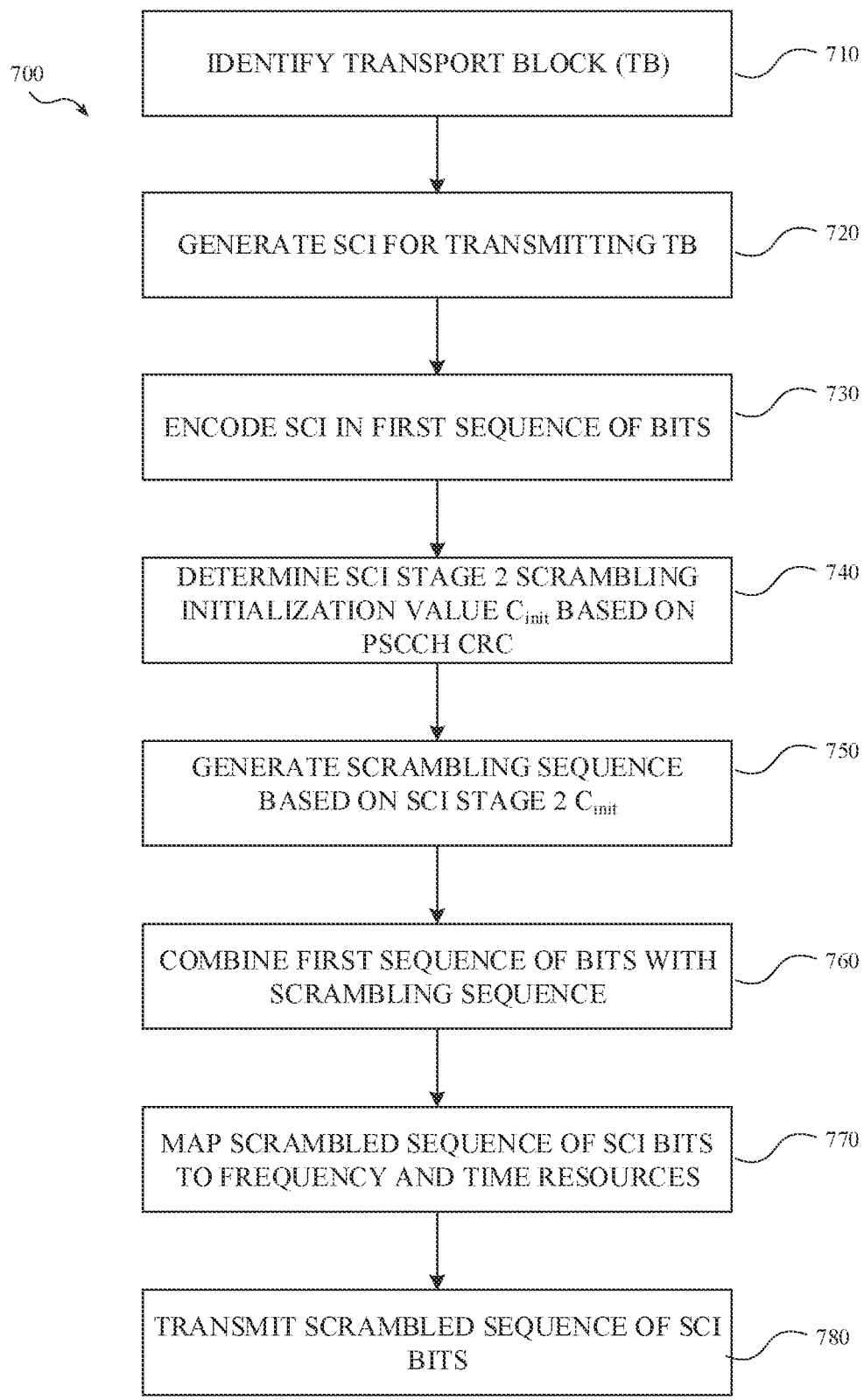
FIG. 7 illustrates a flow diagram of an example method for determining a scrambling initialization value for SCI stage 2 transmission, in accordance with various aspects described.

FIG. 7 is a flow diagram outlining an example method 700 for determining a scrambling initialization value used in sidelink communication. The method 700 may be performed by processors executing stored instructions and/or hardware components of a wireless communication device such as a UE or eNB/gNB. The method includes, at 710, identifying a transport block (TB) for transmission to a UE. At 720 sidelink control information (SCI) stage 2 for transmitting the TB to a UE is generated. At 730 the SCI stage 2 is encoded in a first sequence of bits. The method includes determining an SCI stage 2 scrambling initialization value ($C_{init}$) based on at least a portion of a physical sidelink control channel (PSCCH) cyclic redundancy check (CRC) code at 740. The method includes, at 750, generating a scrambling sequence (e.g., a Gold sequence) based on the SCI stage 2 $C_{init}$. At 760 the first sequence of bits is combined with the scrambling sequence to generate a scrambled sequence of SCI bits and at 770 the scrambled sequence of SCI bits is mapped to frequency and time resources of a physical sidelink shared channel (PSSCH). The method includes, at 780, transmitting the scrambled sequence of SCI bits to the UE using the frequency and time resources.

Figure 8:
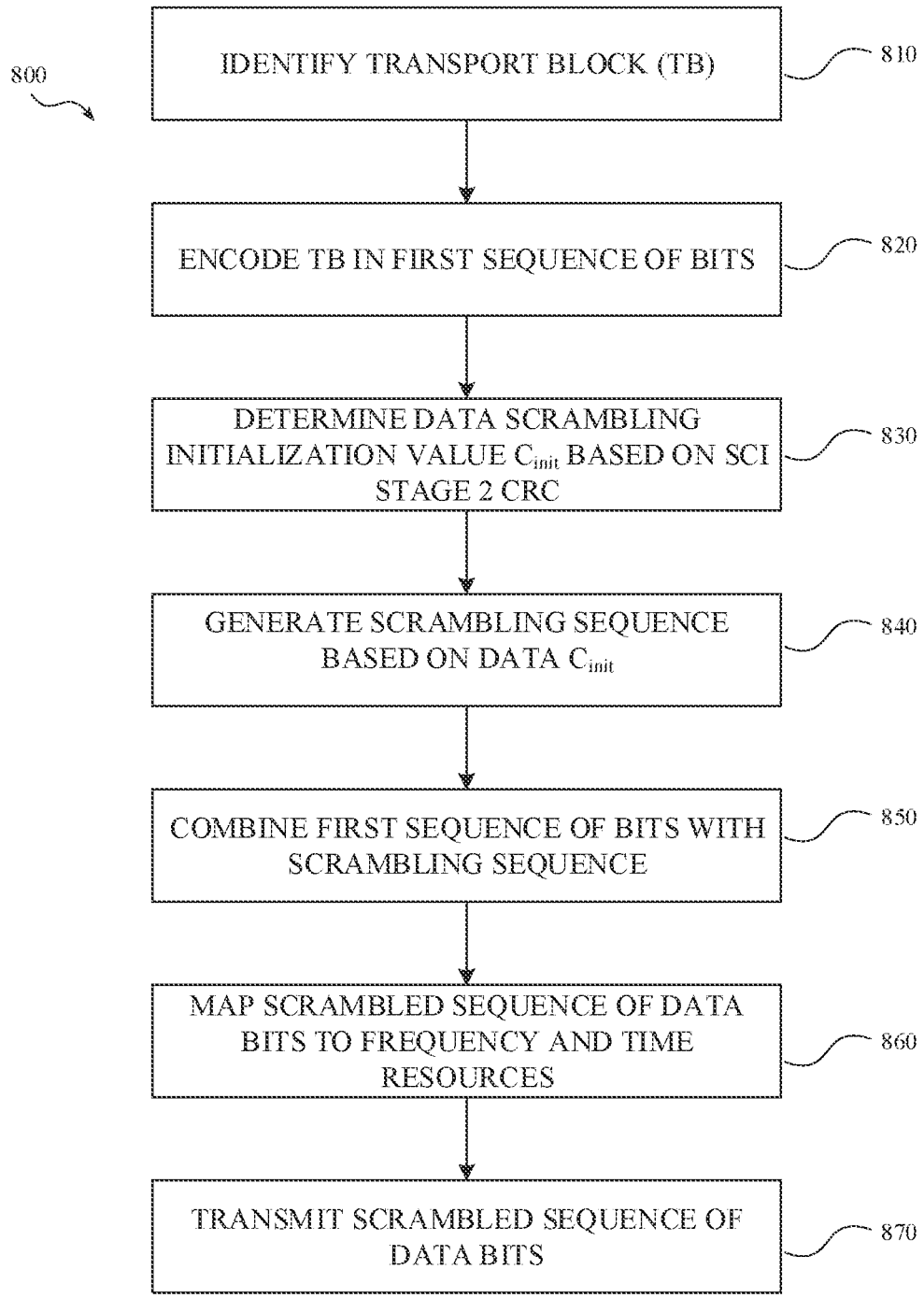
FIG. 8 illustrates a flow diagram of an example method for determining a scrambling initialization value for transport block (TB) transmission, in accordance with various aspects described.

FIG. 8 is a flow diagram outlining an example method 800 for determining a scrambling initialization value used in sidelink communication. The method 800 may be performed by processors executing stored instructions and/or hardware components of a wireless communication device such as a UE or eNB/gNB. The method includes, at 810, identifying a transport block (TB) for transmission to a UE. At 820 the TB is encoded in a first sequence of bits. The method includes determining a sidelink data scrambling initialization value ($C_{init}$) based on at least a portion of a sidelink control information (SCI) stage 2 cyclic redundancy check (CRC) code at 830. The method includes, at 840, generating a scrambling sequence (e.g., a Gold sequence) based on the data $C_{init}$. At 850 the first sequence of bits is combined with the scrambling sequence to generate a scrambled sequence of data bits and at 860 the scrambled sequence of data bits is mapped to frequency and time resources of a physical sidelink shared channel (PSSCH). The method includes, at 870, transmitting the scrambled sequence of data bits to the UE using the frequency and time resources.

Figure 9:
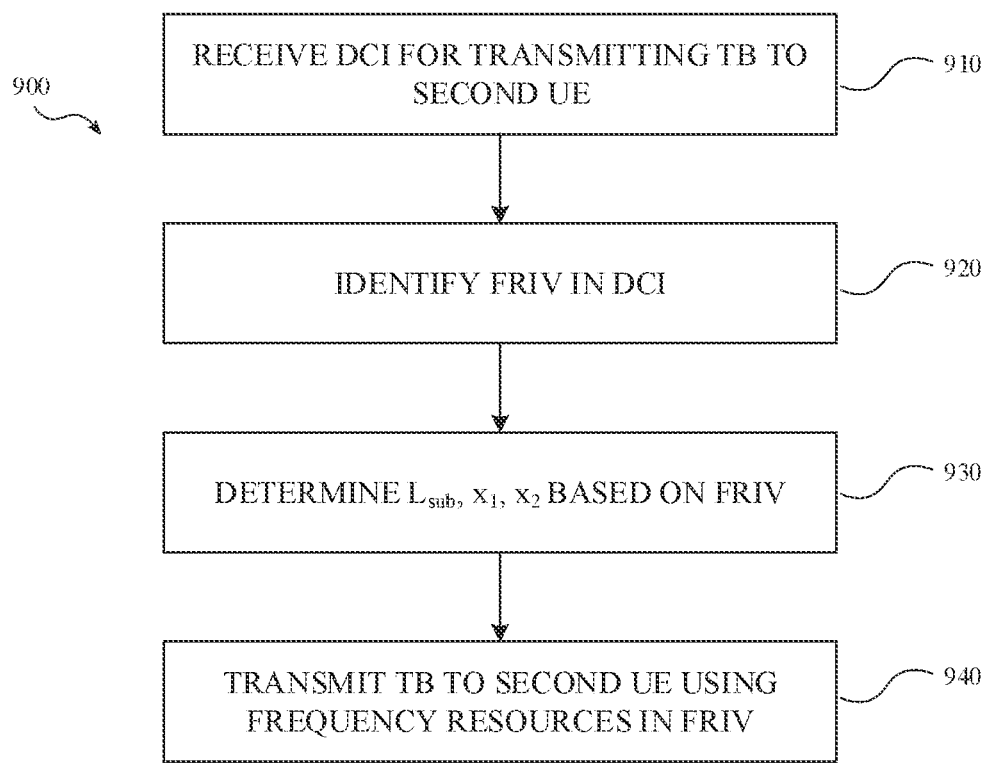
FIG. 9 illustrates a flow diagram of an example method for determining frequency resource allocation in a DCI communication, in accordance with various aspects described.

FIG. 9 is a flow diagram outlining an example method 900 for determining frequency resources for use in sidelink communication. The method 900 may be performed by processors executing stored instructions and/or hardware components of a wireless communication device such as a UE operating in sidelink communication mode 1. The method 900 includes, at 910, receiving, with a first UE, downlink control information (DCI) for transmitting a transport block (TB) to a second UE. At 920 a frequency resource indication value (FRIV) is identified in the DCI. The method includes, at 930, determining, based on the FRIV: a number of sub-channels ($L_{sub}$) for transmitting the TB; a first starting sub-channel index $x_1$ for a first retransmission of the TB; and a second starting sub-channel index $x_2$ for a second retransmission of the TB. The FRIV represents a result of a predetermined function of $L_{sub}$, $x_1$, and $x_2$ that generates a unique value for possible combinations of $L_{sub}$, $x_1$, and $x_2$. At 940 the method includes transmitting the TB to the second UE using frequency resources identified in the FRIV.

Figure 10:
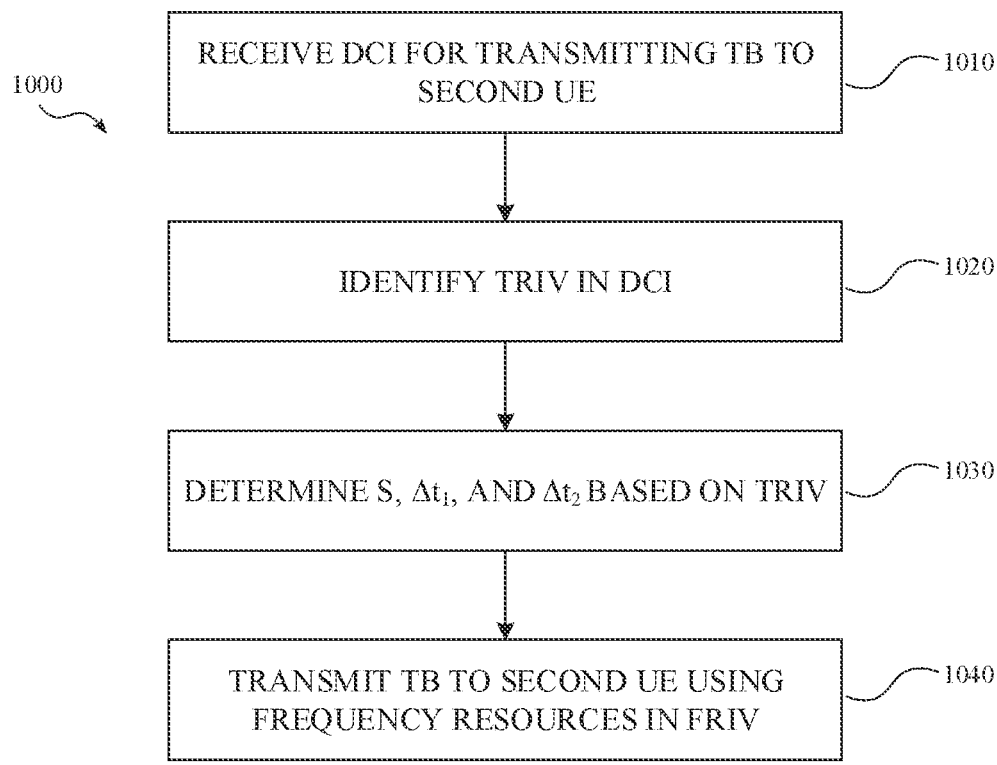
FIG. 10 illustrates a flow diagram of an example method for determining time resource allocation in DCI communication, in accordance with various aspects described.

FIG. 10 is a flow diagram outlining an example method 1000 for determining time resources for use in sidelink communication. The method 1000 may be performed by processors executing stored instructions and/or hardware components of a wireless communication device such as a UE operating in sidelink communication mode 1. The method 1000 includes, at 1010, receiving, with a first UE, downlink control information (DCI) for transmitting a transport block (TB) to a second UE. At 1020 a time resource indication value (TRIV) is identified in the DCI. The method includes, at 1030, determining, based on the TRIV: a resource reservation window size S in a resource pool for sidelink communication; a first time gap $\Delta t_1$ between a first time resource on which the TB is transmitted and a second time resource on which the TB is retransmitted a first time; and a second time gap $\Delta t_2$ between the second time resource and a third time resource on which the TB is retransmitted a second time. The TRIV represents a result of a predetermined function of S, $\Delta t_1$, and $\Delta t_2$ that generates a unique value for possible combinations of S, $\Delta t_1$, and $\Delta t_2$. At 1040 the method includes transmitting the TB to the second UE using time resources identified in the FRIV.

As discussed in the various aspects above, using a FRIV and/or TRIV to indicate resource reservation is an efficient way to reserve resources for sidelink communication.

Figure 11:
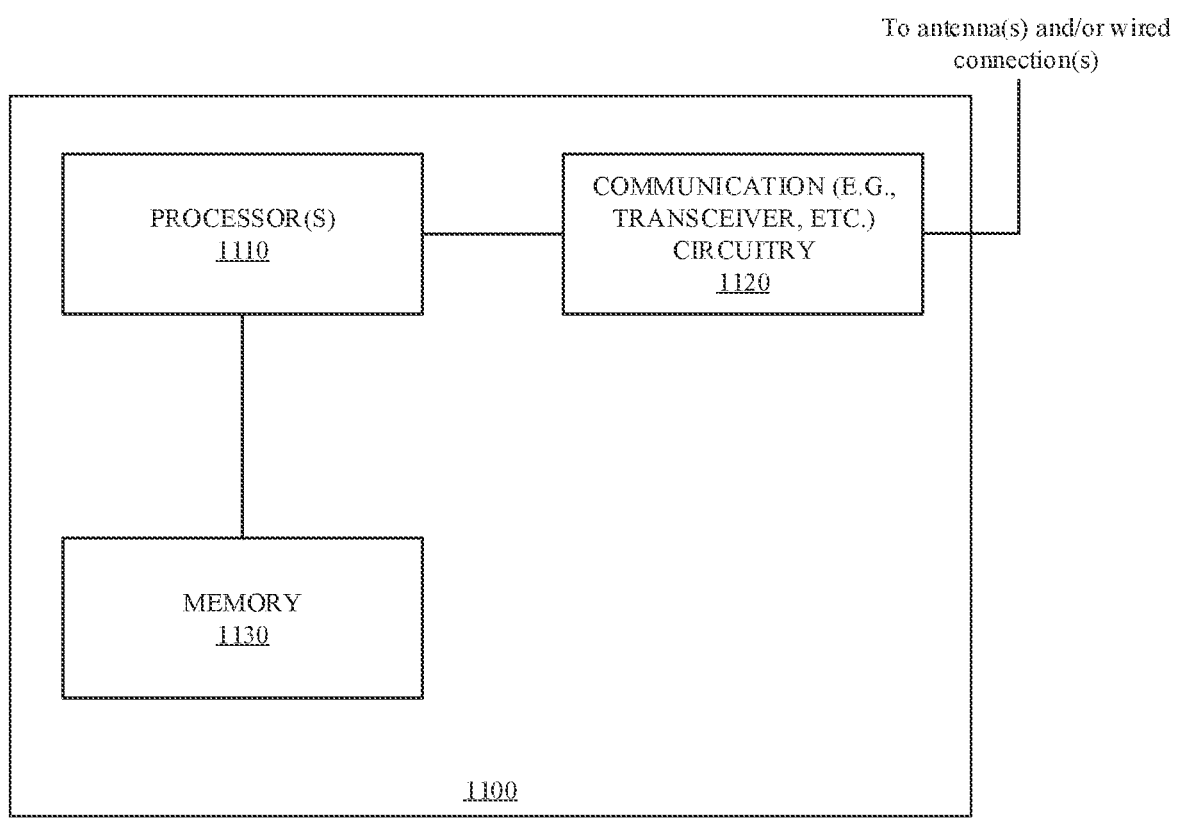
FIG. 11 illustrates a simplified block diagram of a user equipment wireless communication device, in accordance with various aspects described.

Referring to FIG. 11, illustrated is a block diagram of a user equipment wireless communication device (UE) configured to perform sidelink communication, according to various aspects described herein. The UE device 1100 includes one or more processors 1110 (e.g., one or more baseband processors) comprising processing circuitry and associated interface(s), transceiver circuitry 1120 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 1130 (which can comprise any of a variety of storage mediums and can store instructions and/or data associated with one or more of processor(s) 1110 or transceiver circuitry 1120).

In various aspects discussed herein, signals and/or messages can be generated and output for transmission, and/or transmitted messages can be received and processed. Depending on the type of signal or message generated, outputting for transmission (e.g., by processor(s) 1110, processor(s) 1110, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), polar code, etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 1110) can comprise one or more of: identifying physical resources associated with the signal/message, detecting the signal/message, resource element group de-interleaving, demodulation, descrambling, and/or decoding.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases. In some embodiments, the methods illustrated above may be implemented in a computer readable medium using instructions stored in a memory. Many other embodiments and variations are possible within the scope of the claimed disclosure.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising a memory and one or more processors configured to, when executing instructions stored in the memory, cause the UE to:
   generate sidelink control information (SCI) stage 2 for transmitting a transport block (TB) to a second UE;
   determine a SCI stage 2 scrambling initialization value (Cinit) based on at least a portion of a physical sidelink control channel (PSCCH) cyclic redundancy check (CRC) code and a resource pool constant NCONST RP of A bits, wherein NCONST RP is configured for a resource pool allocated for sidelink communication by the UE and A is an integer between 0 and 31;
   generate a scrambling sequence based on the SCI stage 2 Cinit;
   transmit the SCI stage 2 to the second UE based on the scrambling sequence.

2. The UE of claim 1, wherein the one or more processors are configured to cause the UE to determine the SCI stage 2 Cinit using a function, where NPSCCH_CRC corresponds to a decimal representation of the PSCCH CRC code:

$$\text{Cinit}=(\text{NPSCCH\_CRC}*2^4+\text{NCONST\_RP}) \bmod 2^{31}.$$

3. The UE of claim 1, wherein the one or more processors are configured to cause the UE to determine the SCI stage 2 Cinit using a function, where NPSCCH_MSB_CRC corresponds to (31−A) most significant bits of a decimal representation of the PSCCH CRC code:

$$\text{Cinit}=(\text{NPSCCH\_MSB\_CRC}*2^4+\text{NCONST\_RP}) \bmod 2^{31}.$$

4. The UE of claim 1, wherein the one or more processors are configured to cause the first UE to determine the SCI stage 2 Cinit using a function, where NPSCCH_LSB_CRC corresponds to (31−A) least significant bits of a decimal representation of the PSCCH CRC code:

$$\text{Cinit}=(\text{NPSCCH\_LSB\_CRC}*2^4+\text{NCONST\_RP}) \bmod 2^{31}.$$

5. A method baseband processor configured to perform operations, the operations comprising:
   generating sidelink control information (SCI) stage 2 for transmitting a transport block (TB) to a UE;
   determining a SCI stage 2 scrambling initialization value (Cinit) based on at least a portion of a physical sidelink control channel (PSCCH) cyclic redundancy check (CRC) code and a resource pool constant NCONST RP of A bits, wherein NCONST RP is configured for a resource pool allocated for sidelink communication by the UE and A is an integer between 0 and 31;
   generating a scrambling sequence based on the SCI stage 2 Cinit; and
   instructing a transceiver to transmit the SCI stage 2 to the UE based on the scrambling sequence.

6. The method baseband processor of claim 5, the operations further comprising determining the SCI stage 2 Cinit using Previously Presented a function, where NPSCCH_CRC corresponds to a decimal representation of the PSCCH CRC code:

$$\text{Cinit}=(\text{NPSCCH\_CRC}*2^4+\text{NCONST\_RP}) \bmod 2^{31}.$$

7. The method baseband processor of claim 5, the operations further comprising determining the SCI stage 2 Cinit using a function, where NPSCCH_MSB_CRC corresponds to (31−A) most significant bits of a decimal representation of the PSCCH CRC code:

$$\text{Cinit}=(\text{NPSCCH\_MSB\_CRC}*2^4+\text{NCONST\_RP}) \bmod 2^{31}.$$

8. The method baseband processor of claim 5, the operations further comprising determining the SCI stage 2 Cinit using a function, where NPSCCH_LSB_CRC corresponds to (31−A) least significant bits of a decimal representation of the PSCCH CRC code:

$$\text{Cinit}=(\text{NPSCCH\_LSB\_CRC}*2^4+\text{NCONST\_RP}) \bmod 2^{31}.$$

9. A user equipment (UE), comprising a memory and one or more processors configured to, when executing instructions stored in the memory, cause the UE to:
   receive via frequency and time resources of a physical sidelink shared channel (PSSCH), from a second UE, sidelink control information (SCI) stage 2;
   decode the received SCI stage 2 based on a SCI stage 2 scrambling initialization value (Cinit), wherein Cinit is determined based on at least a portion of a physical sidelink control channel (PSCCH) cyclic redundancy check (CRC) code and a resource pool constant NCONST RP of A bits, wherein NCONST RP is configured for a resource pool allocated for sidelink communication by the UE and A is an integer between 0 and 31; and
   receive a transport block (TB) from the second UE based on the SCI stage 2.

10. The UE of claim 9, wherein the SCI stage 2 Cinit is determined using a function, where NPSCCH_CRC corresponds to a decimal representation of the PSCCH CRC code:

$$\text{Cinit}=(\text{NPSCCH\_CRC}*2^4+\text{NCONST\_RP}) \bmod 2^{31}.$$

11. The UE of claim 9, wherein the SCI stage 2 Cinit is determined using a function, where NPSCCH_MSB_CRC corresponds to (31−A) most significant bits of a decimal representation of the PSCCH CRC code:

$$\text{Cinit}=(\text{NPSCCH\_MSB\_CRC}*2^4+\text{NCONST\_RP}) \bmod 2^{31}.$$

12. The UE of claim 9, wherein the SCI stage 2 Cinit is determined using a function, where NPSCCH_LSB_CRC corresponds to (31−A) least significant bits of a decimal representation of the PSCCH CRC code:

$$\text{Cinit}=(\text{NPSCCH\_LSB\_CRC}*2^4+\text{NCONST\_RP}) \bmod 2^{31}.$$

* * * * *